UNITED STATES PATENT OFFICE.

ALBRECHT SCHMIDT, HEINRICH RÖSSNER, AND HANS BALHORN, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

HIGHLY-BROMINATED HALOGEN INDIGOES AND PROCESS OF MAKING SAME.

No. 918,920.  Specification of Letters Patent.  Patented April 20, 1909.

Application filed December 17, 1907. Serial No. 406,946.

*To all whom it may concern:*

Be it known that we, ALBRECHT SCHMIDT, Ph. D., HEINRICH RÖSSNER, Ph. D., and HANS BALHORN, Ph. D., chemists, citizens of the Empire of Germany, and residing at Höchst-on-the-Main, Germany, have invented certain Improvements in Making Highly-Brominated Products from Dihalogen Indigoes, of which the following is a specification.

We have found that when dibromindigo is stirred with strong sulfuric acid, for instance, sulfuric acid of 85 per cent. strength, concentrated sulfuric acid, monohydrate and the like, whereby the sulfate of dibromindigo may be formed, and by then treating the mixture with an excess of more than five atoms of bromin in the cold or by gently heating, greenish-black bromination products are readily obtained which may be separated from the sulfuric acid by filtration. These greenish-black products are to be regarded as perbromids of brominated indigo dyestuffs; they lose when treated with agents capable of eliminating bromin, as, for instance, by or on being treated with hot air, part of the bromin, namely, its loosely bound portion. When stirred into an iced bisulfite solution they yield, according to the bromination, a more or less highly brominated, namely, tri- or tetra-brominated, indigo dyestuff in a most finely divided state. When poured on ice, bisulfite and hydrosulfite, however, grayish-green, in alkali soluble, brominated leuco-compounds are obtained, in the alkaline solution of which cotton and wool are dyed with a beautiful blue color and according to the degree of bromination being more greenish-blue as compared with the vat obtained by means of alkaline reducing agents from the blue parent material.

The bromination in strong sulfuric acid is the stronger and realizable at a lower temperature the more the acid is concentrated; with a sulfuric acid of 85 per cent. strength at 30° C. the product obtained from the green black product of reaction by pouring into bisulfite is essentially a tri-brominated indigo dyestuff, whereas with concentrated sulfuric acid at 40–50° C. it is a tetra-brominated indigo dyestuff; yet, by means of sulfuric acid of 85 per cent. strength at a higher temperature, for instance at 100° C. may be obtained a green-black bromination product which after treating with bisulfite represents a tetra-brominated indigo dyestuff. Other di-halogenindigoes, for instance, di-chlorindigo obtained by chlorinating indigo, have the same reaction.

Example I: 200 parts by weight of dibromindigo, obtained for instance, from indigo by bromination are stirred in a ball-mill with 800 parts by weight of sulfuric acid of 85 per cent. strength whereby gentle heating may occur. Then about 200 parts by weight of bromin are allowed to run in at ordinary temperature and stirring is continued for about 36 hours, preferably while gently heating to about 30–40° C. The product of reaction is separated as a green-black mass. It may be isolated by filtering from the sulfuric acid and may be finally pressed between clay or asbestos. It is a green-black mass having the following properties: soluble in much concentrated sulfuric acid with a strong greenish-blue color; when introduced into water and a bisulfite solution the green-black mass becomes blue and separates a tri-brominated indigo dyestuff in form of blue flakes containing about 45 per cent. of bromin. When introduced into a solution of ice, bisulfite and sodium hydrosulfite a gray-greenish leuco compound is separated soluble in alkali-hydrate with a dark yellow brown color, dyeing cotton and wool clear blue shades of reddish hue.

Example II: 1 part by weight of di-bromindigo, obtained for instance from indigo by bromination is slowly introduced while stirring into 4 parts by weight of concentrated sulfuric acid. For the better division or conversion into indigo it is preferable to grind in the ball-mill for some time. 1, 5 parts by weight of bromin are then allowed to run in while gently cooling and stirring. The temperature is then preferably raised while well stirring or grinding in the ball-mill to about 45° C. and kept for some hours Stirring is then continued at ordinary temperature for some further hours. The product of reaction is then separated in form of a green-black mass; it may be isolated by filtering from the sulfuric acid and finally dried between clay or asbestos. It is a greenish-black mass with the following properties: It is soluble in much concentrated sulfuric acid with a blue color, introduced into water and bisulfite solution the product turns blue, a tetrabrominated indigo dyestuff being separated as blue flakes containing about 55 per cent. strength of bromin; introduced into a solution of ice, bisulfite and sodium hydrosulfite a gray-greenish leuco compound is separated, soluble in alkali-hydrate with a dark yellow brown color, dyeing cotton and wool clear blue shades.

Example III: 10 parts by weight of chlorinated indigo (German Patents Nos. 168683, 165149, 167830) are stirred in the cold with 40 parts of concentrated sulfuric acid and then treated with 15 parts of bromin as described in Example I. The green-black product thus obtained has quite similar properties as the product described in Example I, and contains chlorin and bromin.

Example IV: 10 parts by weight of the product of reaction obtained as in Example II by means of concentrated sulfuric acid are poured into 40 parts by weight of a concentrated bisulfite solution to which ice has been added. The dyestuff separated in blue flakes is isolated by filtering. When dry it is a violet-blue powder soluble in concentrated sulfuric acid with a blue color. The product contains about 55 per cent of bromin and consequently is a tetrabrominated indigo dyestuff.

Example V: 10 parts by weight of the green-black product obtained as in Example II by means of concentrated sulfuric acid, preferably by filtering from the excess of sulfuric acid, are introduced while stirring into an iced solution of 15 parts by weight of sodium hydrosulfite and 20 parts by weight of a concentrated bisulfite solution. On the evolution of sulfurous acid being complete the gray-greenish leuco product thus obtained is filtered. It is soluble in sulfuric acid with a dirty olive-green color, in alkali-hydrate with a yellow brown color. Wool and cotton are dyed in alkaline solution clear blue shades.

Having now described our invention, what we claim is:—

1. The herein described process of making greenish-black brominated products from di-halogen indigoes containing at least five atoms of halogen, which consists in treating dihalogen-indigosulfate in strongly concentrated sulfuric acid with an excess of more than five atoms of bromin.

2. As new products, the greenish-black brominated derivatives of indigo containing at least five atoms of halogen, soluble in much concentrated sulfuric acid, turning blue when mixed with water and bisulfite, yielding with hydrosulfite grayish-green leuco-bodies soluble in alkali-hydrate.

In testimony, that we claim the foregoing as our invention, we have signed our names in presence of two subscribing witnesses.

ALBRECHT SCHMIDT.
HEINRICH RÖSSNER.
HANS BALHORN.

Witnesses:
   JEAN GRUND,
   CARL GRUND.